(12) United States Patent
Batra et al.

(10) Patent No.: US 7,171,685 B2
(45) Date of Patent: Jan. 30, 2007

(54) STANDARD FORMAT SPECIFICATION FOR AUTOMATICALLY CONFIGURING IP SECURITY TUNNELS

(75) Inventors: Gaurav Batra, Austin, TX (US); Dave Kemper, Austin, TX (US); Charles Kunzinger, Morrisville, NC (US); Guha Prasad Venkataraman, Austin, TX (US); Jacqueline Hegedus Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 09/935,395

(22) Filed: Aug. 23, 2001

(65) Prior Publication Data

US 2003/0135753 A1    Jul. 17, 2003

(51) Int. Cl.
*G06F 9/00* (2006.01)
*G06F 17/21* (2006.01)

(52) U.S. Cl. .................. 726/14; 726/1; 726/3; 715/513
(58) Field of Classification Search ................ 713/201, 713/14; 709/227; 726/1, 3; 715/513
See application file for complete search history.

(56) References Cited

U.S. PATENT DOCUMENTS

| | | | |
|---|---|---|---|
| 6,076,168 A * | 6/2000 | Fiveash et al. ............ 713/201 |
| 6,631,416 B2 * | 10/2003 | Bendinelli et al. .......... 709/227 |
| 6,738,909 B1 * | 5/2004 | Cheng et al. ............... 713/201 |
| 6,823,462 B1 * | 11/2004 | Cheng et al. ............... 713/201 |
| 6,938,155 B2 | 8/2005 | D'Sa et al. |
| 2001/0010076 A1 * | 7/2001 | Wray ........................ 713/151 |
| 2002/0178240 A1 | 11/2002 | Fiveash et al. |
| 2002/0178355 A1 * | 11/2002 | D'Sa et al. ................. 713/156 |
| 2002/0178361 A1 | 11/2002 | Genty et al. |
| 2003/0005328 A1 * | 1/2003 | Grewal et al. .............. 713/201 |

OTHER PUBLICATIONS

Pfeiffer, Ralf I. Mar. 2, 1999. XML Tutorials for Programmers. retrieved from http://wwww.informatik.hu-berlin.de/~xing/Lib/RIP-writing.pdf.*

* cited by examiner

*Primary Examiner*—Emmanuel L. Moise
*Assistant Examiner*—Michael Pyzocha
(74) *Attorney, Agent, or Firm*—Duke W. Yee; Herman Rodriguez; Mari Stewart

(57) ABSTRACT

A data processing system, method, and product are disclosed for automatically configuring IP security tunnels. A security policy specification format is established that is capable of being utilized by any one of multiple different operating systems and any one of multiple different machine types. An IP security tunnel is automatically configured utilizing the security policy specification format.

36 Claims, 6 Drawing Sheets

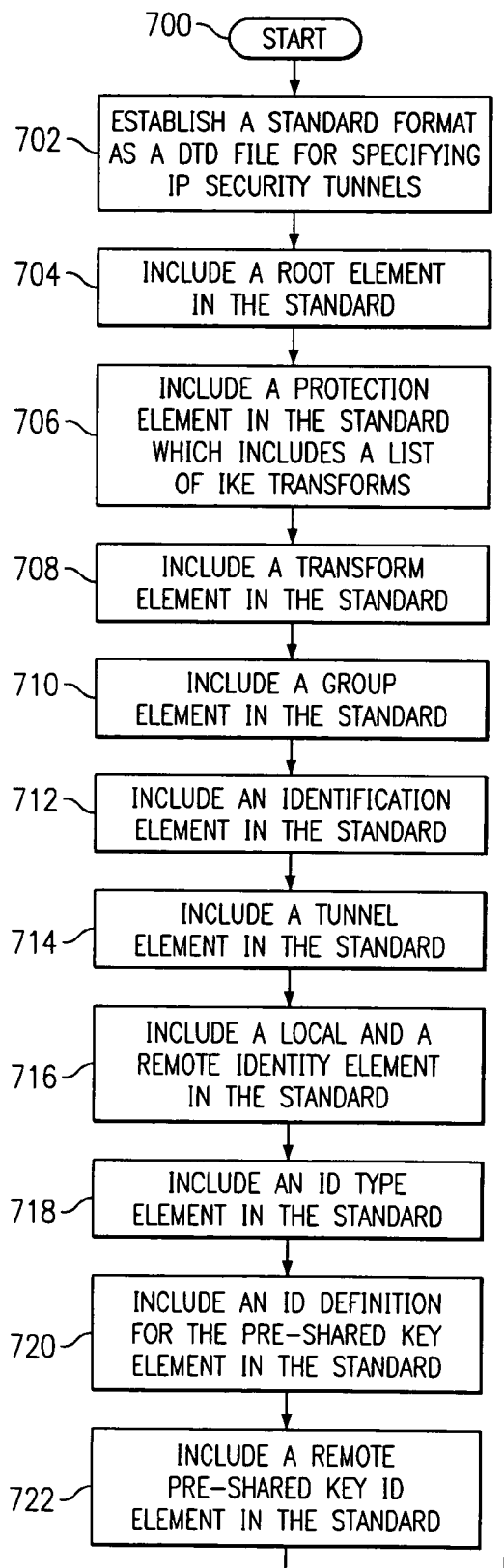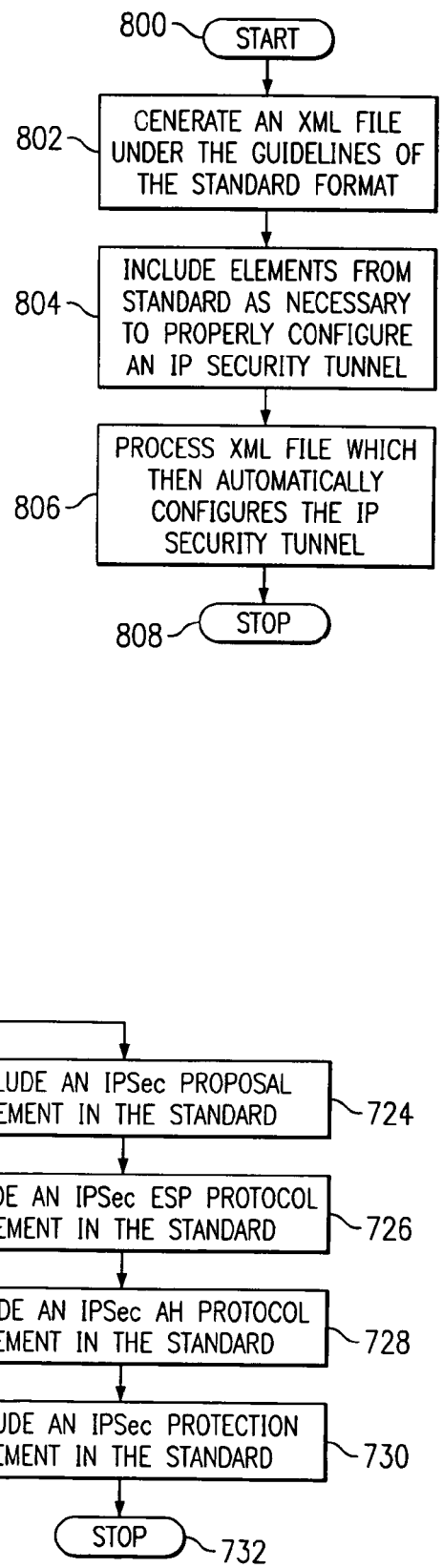

STANDARD FORMAT SPECIFICATION FOR AUTOMATICALLY CONFIGURING IP SECURITY TUNNELS

BACKGROUND OF THE INVENTION

1. Technical Field

The present invention relates in general to a method and system for securing networks. Still more particularly, the present invention relates to an improved system and method for providing a standard format to use to configure IP security tunnels where the standard format may be used by any one of multiple, different operating systems and multiple, different machine types.

2. Description of Related Art

In today's modern environment, many businesses and organizations deal with global markets and have global logistic concerns. Many organizations have facilities disbursed across the country or even around the world. Despite their global presence, these organizations need a way to maintain fast, secure and reliable communications with individuals and other offices throughout the world.

Until recently, fast, secure and reliable communication has meant the use of leased lines to maintain a Wide Area Network (WAN). Leased lines, ranging from ISDN (Integrated Services Digital Network, 144 Kbps) to OC3 (Optical Carrier-3, 155 Mbps) fiber, provided a company with a way to expand their private network beyond their immediate geographic area. A WAN had obvious advantages over a public network like the Internet when it came to reliability, performance and security. But maintaining a WAN, particularly when using leased lines, can become quite expensive and often rises in cost as the distance between the offices increases. In addition, using WANs is not a scaleable solution as the number of interconnections rises exponentially as new locations are added.

In essence, a Virtual Private Network, or "VPN," is a private network that uses a public network (usually the Internet) to connect remote sites or users together. To make communication between computers private, VPNs use security methods, such as encryption, to maintain privacy. Instead of using a dedicated, real-world connection such as a leased line, a VPN uses "virtual" connections routed through the Internet from the company's private network to the remote site or employee.

A well-designed VPN can greatly benefit a company. For example, it can: extend geographic connectivity, improve security, reduce operational costs versus traditional WAN, reduce transit time and transportation costs for remote users, improve productivity, simplify network topology, provide global networking opportunities, provide telecommuter support, provide broadband networking compatibility, and provide faster ROI (Return On Investment) than traditional WAN. A well-designed VPN, therefore, should incorporate features for security, reliability, scalability, network management, and policy management.

In a VPN, each remote member of the network is able to communicate in a secure and reliable manner using the Internet as the medium to connect to a private local area network, or "LAN." A VPN can grow to accommodate more users and different locations much easier than a leased line. In fact, scalability is a major advantage that VPNs have over typical leased lines. Unlike leased lines, where the cost increases in proportion to the distances involved, the geographic locations of each office matter little in the creation of a VPN.

A well-designed VPN uses several methods for keeping connections and data secure. Firewalls provide a strong barrier between private networks and the Internet. Firewalls can restrict the number of open ports, what type of packets are passed through, and which protocols are allowed through. Encryption is used to encode all the data that one computer is sending to another into a form that only the other computer will be able to decode. Two modes of authentication are used on VPNs: pre-shared keys and digital signatures.

Pre-shared key encryption means that each partner in a VPN has a secret "key" that it can use to authenticate the remote identifier of a VPN. Pre-shared key encryption requires that you know which computers will talk to each other, and that you install the same key on each one.

Digital signature authentication, on the other hand, uses a combination of a private key and a public key. The private key is known only to your computer while the public key is given by your computer to any computer that wants to communicate securely with it. To decode an encrypted message, the receiving computer must use the public key provided by the originating computer. Public keys are bound to an identity, such as a business or a user, by using "digital certificates" that are typically issued by a trusted third party.

The key is based on a hash value. This is a value that is computed from a base input number using a hashing algorithm. The important thing about a hash value is that it is nearly impossible to derive the original input number without knowing the data used to create the hash value. Public keys generally use complex algorithms and very large hash values for encrypting.

On a typical VPN, the authentication of the initial connection is accomplished using public key algorithm. Once the connection is established and authenticated, keying material is sent from one computer to the other and the connection switches to symmetric encryption, such as DES or Triple DES. Symmetric encryption is used during data transfer because the amount of time decoding data is reduced.

The Internet Protocol Security Protocol (IPsec) provides enhanced security features such as strong encryption algorithms and comprehensive authentication. IPsec has two encryption modes: tunnel and transport. Tunnel mode tunnels the original packet and builds a new IP header, while transport mode inserts the IPsec payload between the IP header and the data. Systems that are IPsec compliant can take advantage of this protocol. Also, all devices negotiate security parameters, but they must have compatible security policies set up. IPsec works well on both Remote-Access and Site-to-Site VPNs. IPsec must be supported at both tunnel interfaces to work.

The IPsec protocol can be used in conjunction with the Internet Key Exchange security protocol (IKE). This protocol provides additional authentication and encryption features to the IPsec standard.

Many VPNs rely on tunneling to create a private network that reaches across the Internet. Essentially, tunneling is the process of placing an entire packet within another packet and sending it over a network. The protocol of the outer packet is understood by the network and both points, called tunnel interfaces, where the packet enters and exits the VPN. Tunneling uses three different protocols: (1) carrier protocol: the protocol used by the network that the information is traveling over; (2) encapsulating protocol: the protocol that is wrapped around the original data; and (3) passenger protocol: the original data (IPX, NetBeui, IP) being carried.

Tunneling has important implications for VPNs. For example, a packet that uses a protocol not supported on the Internet (such as NetBeui) can be placed inside an IP packet and sent it safely over the Internet. Or a packet that uses a private (non-routable) IP address can be placed inside a packet that uses a globally unique IP address in order to extend a private network over the Internet. Tunneling is also necessary for gateways because the IP header needs to have the gateway IP address in it.

An analogy of tunneling is having a computer delivered to you by a courier service. The vendor packs the computer (passenger protocol) into a box (encapsulating protocol) which is then put on a courier truck (carrier protocol) at the vendor's warehouse (entry tunnel interface). The truck (carrier protocol) travels over the highways (Internet) to your home (exit tunnel interface) and delivers the computer. You open the box (encapsulating protocol) and remove the computer (passenger protocol).

The Internet Protocol Security Protocol (IPsec) is a set of open standards. These standards are implemented in a variety of different ways by each different operating system that supports these standards. Therefore, a computer system that is initiating a communication may implement the Internet Protocol Security Protocol in one way while a computer system that is a responder computer system may implement IPsec in a different way.

In known systems when a system administration needs to configure a tunnel between two computer systems that implement the IPsec protocol in different ways, the system administration must configure the tunnel manually by directly inputting the various necessary parameters. This process of manually configuring the security tunnels can become very time consuming, especially in systems requiring many different tunnels.

Therefore, a need exists for a method, system, and product for automatically configuring an IP security tunnel utilizing a standardized security policy specification format in computer systems using any one of different operating systems.

SUMMARY OF THE INVENTION

A data processing system, method, and product are disclosed for automatically configuring IP security tunnels. A security policy specification format is established that is capable of being utilized by any one of multiple different operating systems and any one of multiple different machine types. The format specifies a plurality of different elements that may be used to define a configuration of an IP security tunnel.

In order to define an IP security tunnel configuration, a system administrator first generates an XML file utilizing the elements defined by the standard format. This XML file defines the configuration of a particular IP security tunnel. The configuration of multiple IP security tunnels may be compared by comparing their respective XML files.

The XML file may be used by any type of machine type and any type of operating system. When the XML file is processed, it will automatically configure an IP security tunnel as defined by the elements included in the file.

The format includes elements to define the various parameters defined by the IPsec protocol and the Internet Key Exchange (IKE) protocol. The format includes elements to define separate IKE and IPsec protections. Elements are also included to describe remote and local end points, groups, and pre-shared keys.

When the format is used, tunnels can be configured to a large number of endpoints easily, quickly, and programmatically.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a high level flow chart which illustrates establishing a standard format to use by any operating system and any machine type to automatically configure IP security tunnels in accordance with the present invention; and FIG. 8 illustrates a high level flow chart which depicts automatically configuring an IP security tunnel using a standard format in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

Figure 1:
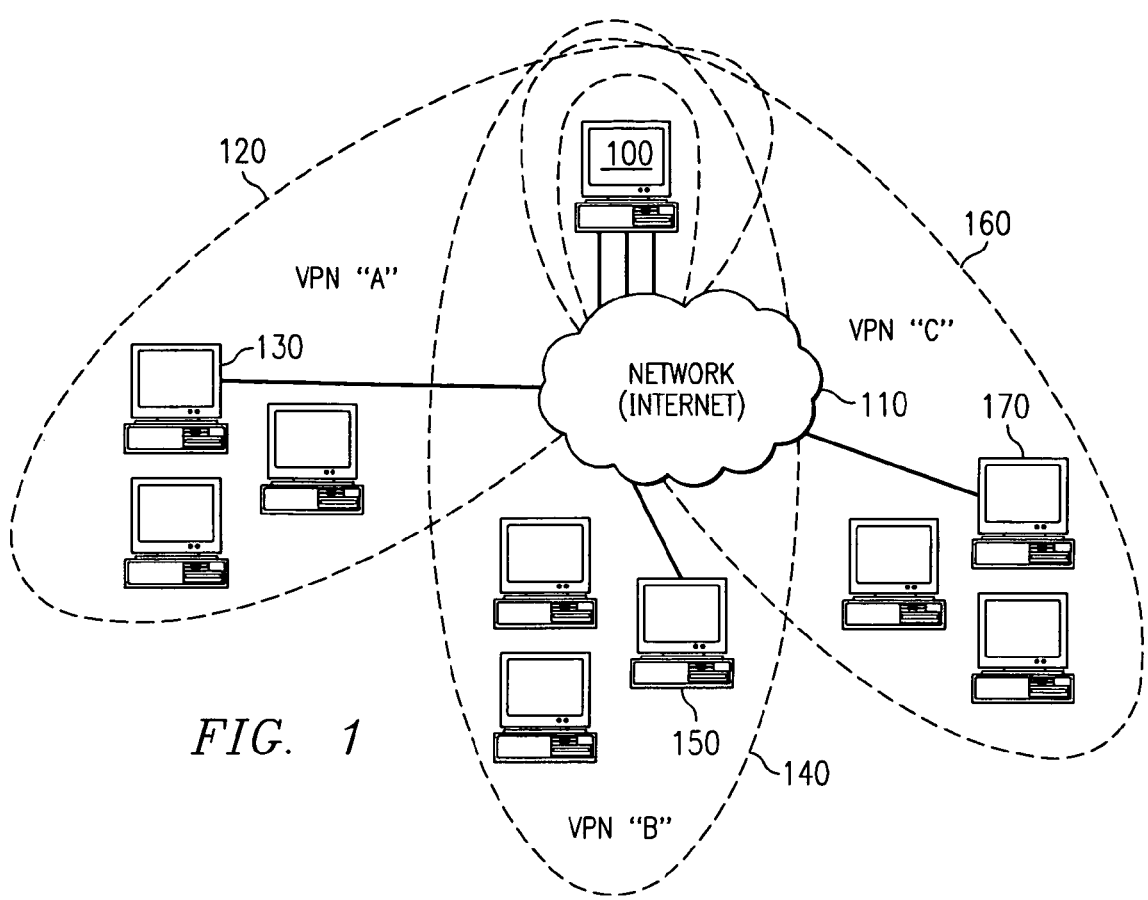
FIG. 1 is a system diagram showing a single computer using multiple tunnels to communicate with various VPNs.

FIG. 1 shows a system diagram of a single computer using multiple tunnels to communicate with various virtual private networks (VPNs). Computer system 100 is shown using computer network 110, such as the Internet, to communicate with computers using three VPNs—VPN "A" (120), VPN "B" (140), and VPN "C" (160). Three tunnels are shown connecting computer system 100 to first computer system 130, second computer system 150, and third computer system 170. First computer system 130 is shown as a member of VPN "A" (120), second computer system 150 is shown as a member of VPN "B" (140), and third computer system 170 is shown as a member of VPN "C" (160). Each of the VPNs may use a different authentication means to secure the data traveling between the computer systems. For example, computers within VPN "A" 120 may use a pre-shared key (i.e., a common key shared amongst the computers used to derive encryption keys). VPN "B" 140, on the other hand, may use public key encryption to encrypt the data. Finally, VPN "C" 160 may use digital signatures with digital certificates verified by a trusted third party, also called a "certification authority," or "CA".

Further each of these computers may be implemented using different hardware, i.e. different machine types. Each computer system may also be utilizing a different operating system.

Figure 2:
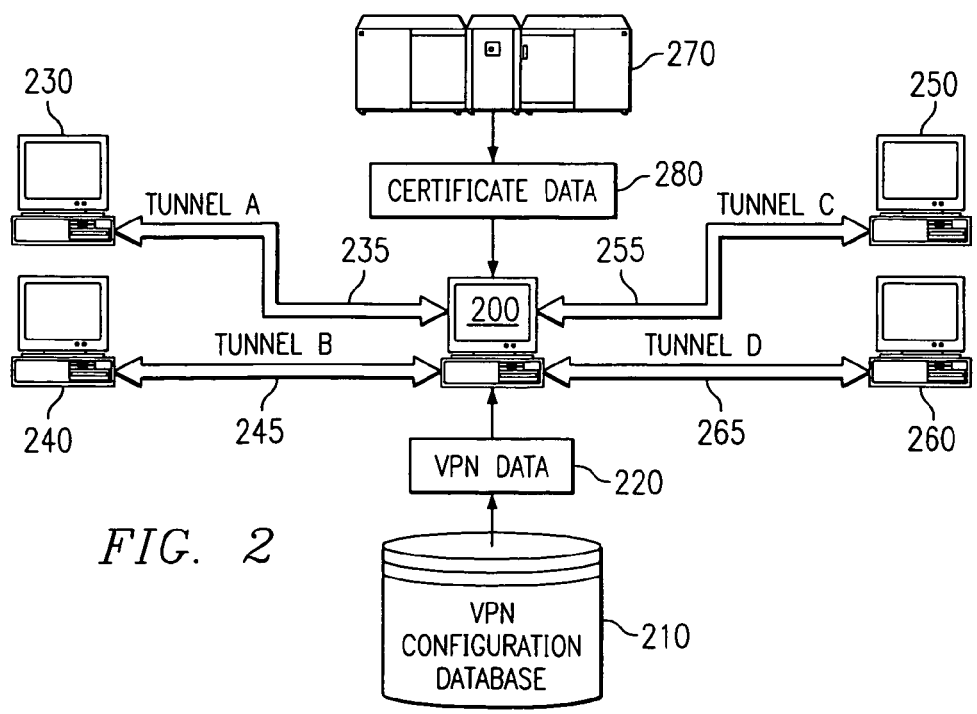
FIG. 2 is a diagram showing tunnels being created between a computer and other computers using VPN configuration data and certificate data.

FIG. 2 shows a diagram of tunnels being created between a computer and other computers using VPN configuration data and certificate data. Computer system 200 establishes various tunnels used to securely transmit data to and from other computer systems. Computer systems that computer system 200 wishes to securely communicate with over a VPN are identified in VPN configuration database 210. VPN data 220 contains information for connecting with a particular computer system. Using VPN configuration database 210, any number of VPNs can be established between computer system 200 and other computer systems. Some VPNs use certificate data 280 supplied by a trusted third party computer system 270. The use of a trusted third party aids in authenticating users and ensuring that an impostor does not take the place of another computer system.

In the example shown, computer system 200 establishes tunnel A 235 securely connecting first computer system 230 with computer system 200. Likewise, tunnel B 245 securely connects second computer system 240 with computer system 200, tunnel C 255 securely connects third computer system 250 with computer system 200, and tunnel D 265 securely connects fourth computer system 260 with computer system 200. Each of these computer systems, 230, 240, 250, and 260, have identification information and authentication information stored in VPN configuration database 210.

Figure 3:
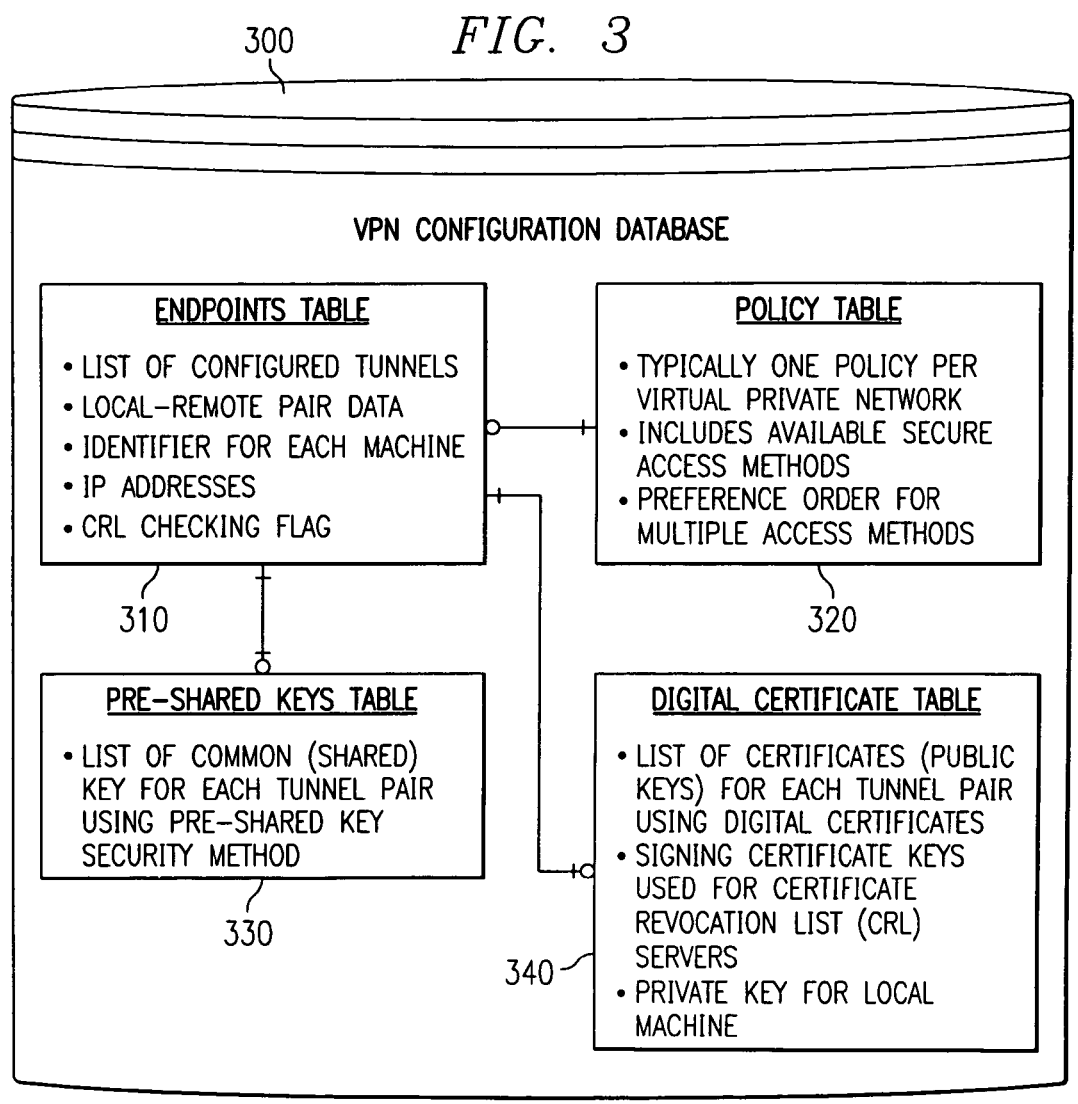
FIG. 3 is a database diagram showing tables used in configuring tunnels between the computer and other computer systems.

FIG. 3 shows a database diagram of tables used in configuring tunnels between the computer and other computer systems. VPN configuration database 300 is shown with four tables. Endpoints table 310 includes a list of configured tunnels between the computer system and other computer systems. One end of each endpoint identifies the computer system, while the other end of the endpoint identifies a remote computer. Each of the computers included in endpoints table 310 is identified with an identifier, such as an address. In addition, endpoints table 310 includes IP addresses for the remote computer systems. An IP address is an identifier for a computer or device on a TCP/IP network. Networks using the TCP/IP protocol route messages based on the IP address of the destination. The format of an IP address is a 32-bit numeric address written as four numbers separated by periods. Each number can be zero to 255. For example, 1.160.10.240 could be an IP address. Within an isolated network, IP addresses can be assigned at random so long as each one is unique. However, connecting a private network to the Internet requires using registered IP addresses (called Internet addresses) to avoid duplicates. The four numbers in an IP address are used in different ways to identify a particular network and a host on that network. Finally, endpoints table 310 includes a flag indicating whether a Certificate Revocation List (CRL) is used to check whether a given certificate has been revoked. Other valid ID types include FQDN, user@FQDN, distinguished names, and key IDs.

Endpoints table 310 has relationships with three other tables in VPN configuration database 300. Each local-remote computer pair included in endpoints table 310 may have a pre-shared key stored in pre-shared keys table 330 or a public key stored in digital certificate table 340. In some situations, a local-remote computer pair may have both a pre-shared key and a public key. Finally, a policy from policy table 320 exists for one or more set of endpoints determining the access method and preference order for connecting the local computer to a given remote computer.

Policy table 320 is used to employ a connection policy used by a given VPN. Typically, one policy exists for each VPN that the local machine uses. Policy table 320 includes the available secure access methods, such as pre-shared key and digital certificates, that are available in using the VPN. In addition, policy table 320 includes a preference order for establishing secure connections when multiple access methods are available. For example, a VPN may prefer using digital certificates to establish secure connections. However, if the computer system is unable to make a secure connection using a digital certificate, a pre-shared key method may also be available as a second course of action.

Pre-shared keys table 330 includes a list of common, or shared, keys for each tunnel pair that uses a pre-shared key security method. Computers using a pre-shared key have the same key to derive encryption and decryption keys. The pre-shared key is often provided to the computer system or the user in a way to reduce the chance that the key is misappropriated. For example, a pre-shared key may be mailed from a company to a client. The client then uses the pre-shared key to establish secure communications with the company computer system. Different pre-shared keys are used for each combination of computer systems. In this manner, if one pre-shared key is compromised only data at the two systems using that key are in jeopardy.

Digital certificate table 340 includes a list of certificates (Public Keys) for each tunnel pair that uses digital certificates to secure communications. In addition, digital certificate table 340 may include signing digital certificate keys used for Certificate Revocation List servers to determine whether a given certificate has been revoked. Public key encryption uses a private key to encrypt information destined for a given computer system. The receiving computer system deciphers the information by using the sender's public key. The local computer system's private key is also included in digital certificate table 340.

Figure 4:
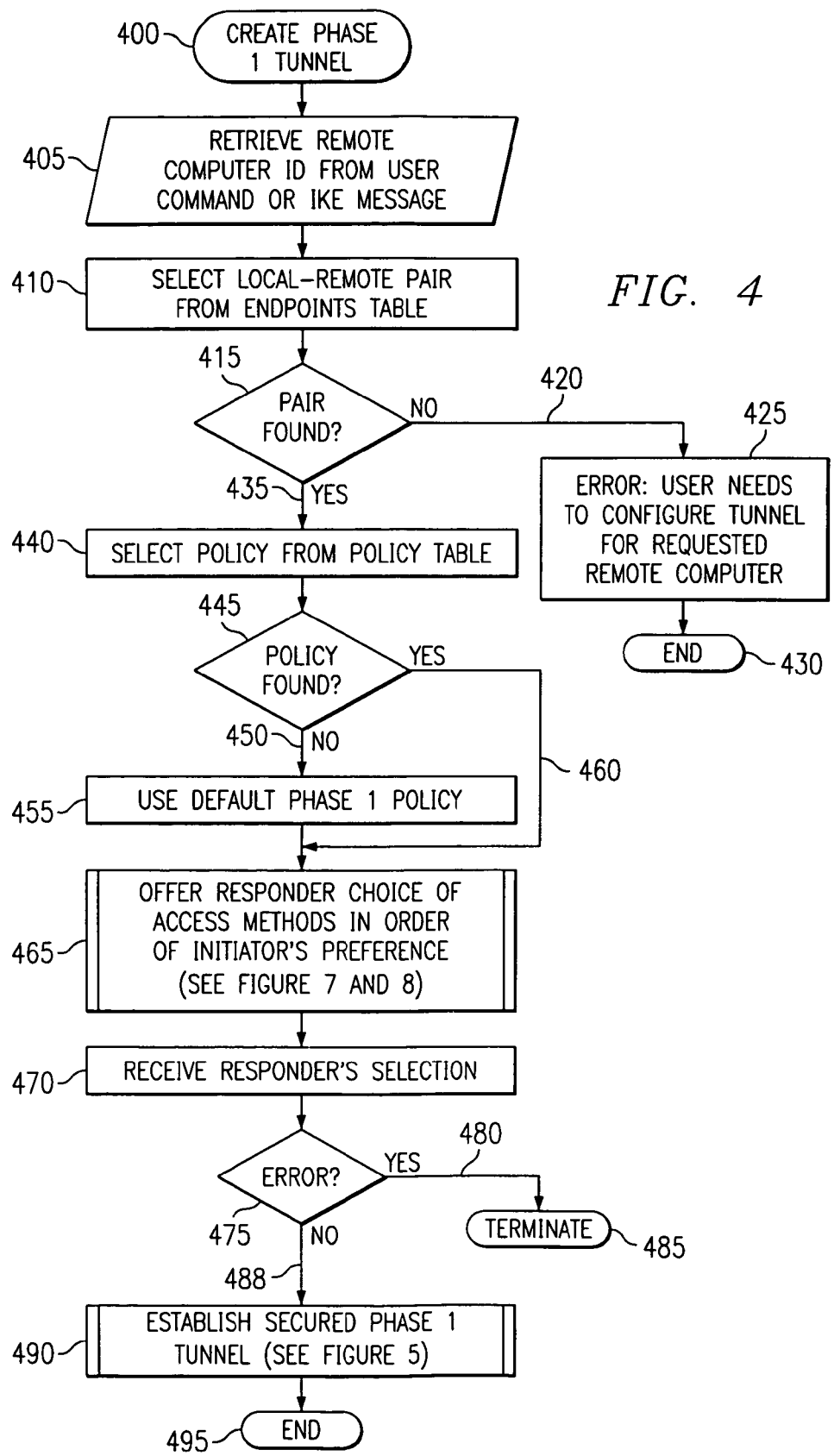
FIG. 4 illustrates a high level flow chart which depicts the creation of a phase 1 tunnel using VPN configuration data in accordance with the present invention.

FIG. 4 shows a flowchart of the creation of a tunnel using VPN configuration data. Processing commences at 400 whereupon a remote computer identifier is retrieved (input 405) corresponding to a remote computer to be connected in a VPN with the current computer system. The remote computer ID is typically received from a user command or IKE message. The remote computer ID is retrieved for both the initiator and the responder. The local-remote endpoints pair corresponding to the remote computer system identifier and the local computer identifier is selected from the endpoints table (step 410). The ID Rules List links the local-remote endpoints pair to a security policy name that is used in selecting the security policy (see step 440). A determination is made as to whether the endpoints pair was found (decision 415). If the pair was not found, decision 415 branches to "no" branch 420 whereupon an error is reported that the user needs to configure a tunnel with the remote computer system before the tunnel can be used (step 425) and processing terminates (end 430). Additionally, step 425 could invoke a configuration screen allowing the user to configure the tunnel with the remote computer by supplying the needed access information.

If the pair was found in the endpoints table, decision 415 branches to "yes" branch 435 whereupon a policy corresponding to the local-remote pair is selected from the policy table (step 440). The policy includes a proposal list with separate initiator and responder proposals. Proposals have general characteristics, like lifetimes and transform names. Transforms include specific encryption algorithms, hash algorithms, and authentication methods being proposed. A determination is made as to whether a corresponding policy was found (decision 445). If a corresponding policy was not found, decision 445 branches to "no" branch 450 whereupon a default policy is used (step 455). For example, a default policy could be used to use a digital certificate (if available), before attempting to use any available pre-shared keys. If the policy is found, decision 445 branches to "yes" branch 460.

Figure 5:
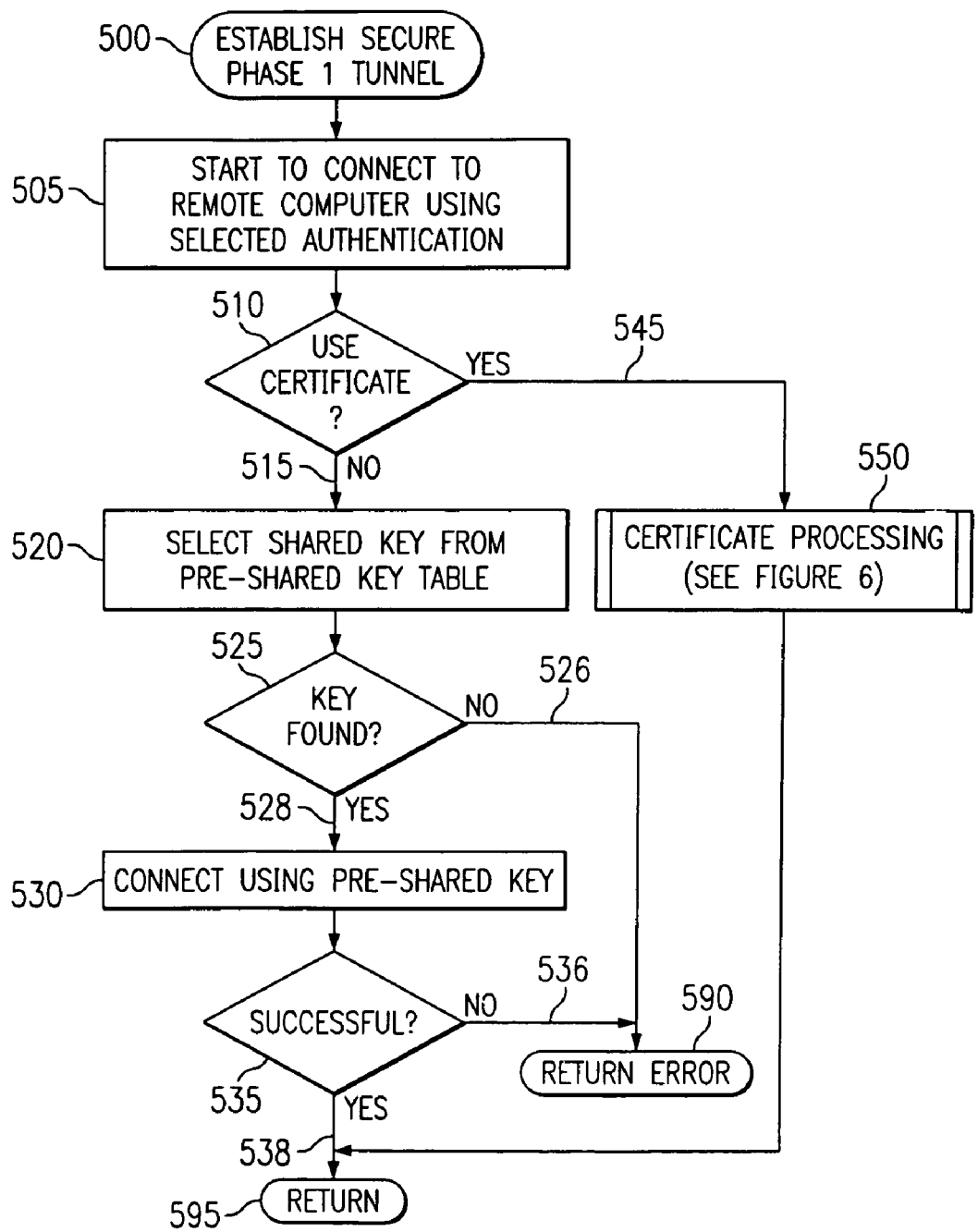
FIG. 5 depicts a high level flow chart which illustrates the details involved in creating a secure phase 1 tunnel using the VPN configuration data in accordance with the present invention.
Figure 6:
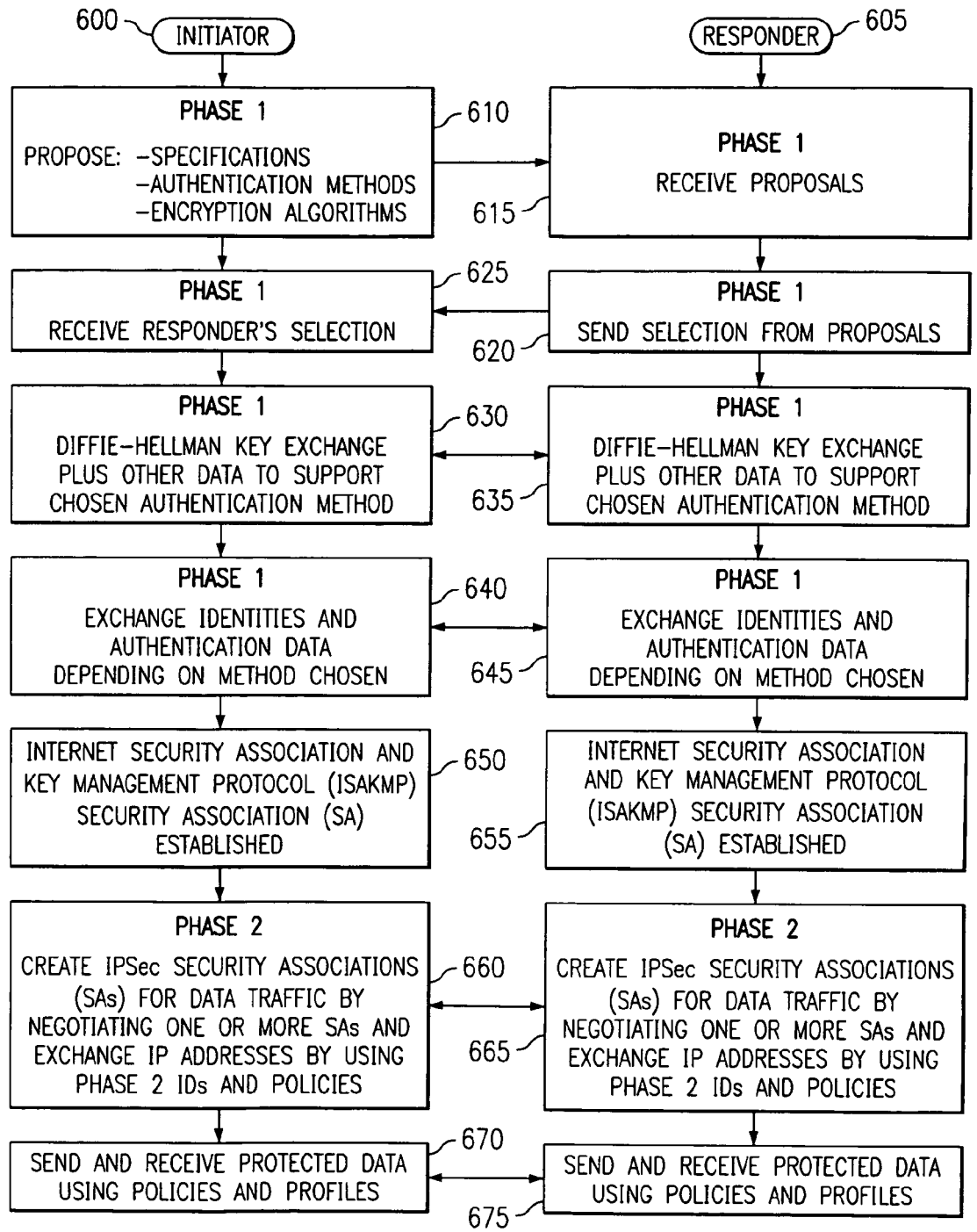
FIG. 6 illustrates a high level flow chart which depicts the steps performed in using policies to communicate through phase 1 and phase 2 processing in accordance with the present invention.

The initiator proposes one or more authentication methods to the responder in the order of initiator's preference (predefined process 465, see FIG. 6 for further details). The initiator receives the responder's selection of an authentication method (step 470). A determination is made as to whether an error occurred in receiving the responder's selection (decision 475). If an error occurred, decision 475 branches to "yes" branch 480 whereupon processing terminates at 485. On the other hand, if an error did not occur, decision 475 branches to "no" branch 488 whereupon a secure phase 1 tunnel is created between the initiator and the responder for setting up the phase 2 negotiations to select security choices for data traffic (predefined process 490, see FIG. 5 for further details). Predefined process 490 includes validating IDs, certificates, or pre-shared keys as well as checking the "liveliness" of the connection that the other computer matches the retrieved endpoint computer description during the entire conversation. After predefined process 490, create phase 1 tunnel processing terminates at 495.

FIG. 5 shows a flowchart of the details involved in creating a secure tunnel using the VPN configuration data. Processing commences at 500 whereupon the local computer connects to the remote computer using the selected authentication method (step 505). A determination is made as to whether the authentication method uses a digital certificate (decision 510). If the authentication method uses a digital certificate, decision 510 branches to "yes" branch 545 whereupon certificate processing commences.

On the other hand, if the access method does not use a digital certificate, decision 510 branches to "no" branch 515 whereupon a pre-shared key corresponding to the remote computer system is selected from the pre-shared key table (step 520). A determination is made as to whether the pre-shared key is found (decision 525). If the pre-shared key is not found, decision 525 branches to "no" branch 526 whereupon an error is returned at 590.

If the pre-shared key is found, decision 525 branches to "yes" branch 528 whereupon the local machine attempts to connect to the remote machine using the selected pre-shared key (step 530). A determination is made as to whether the local machine successfully connected to the remote machine (decision 535). If the local machine did not successfully connect to the remote machine, decision 535 branches to "no" branch 536 whereupon an error is returned at 590. On the other hand, if the local machine successfully connects to the remote machine, decision 535 branches to "yes" branch 538 whereupon processing returns to the calling routine (return 595, see FIG. 4).

FIG. 6 is a flowchart showing steps performed in using policies to communicate through phase 1 and phase 2 processing.

In Phase 1, Initiator 600 commences by proposing (step 610) specifications, authentication methods, and encryption algorithms to responder 605. Responder, in turn, receives the proposal (step 615) and selects an authentication method, specifications, and an encryption algorithm from the proposal and returns the selection to the initiator (step 620). Responder expects to receive these specifications in a DTD file which follows the standard format, as depicted in FIG. 7. The initiator receives the responder's selection (step 625). A Diffie-Hellman key exchange is performed between the initiator and responder (steps 640 and 645) and authentication data is exchanged depending upon the selected authentication method.

Each party, the initiator and the responder, establishes an Internet Security Association and Key Management Protocol (ISAKMP) Security Association (steps 650 and 655) to use in securing information sent between the computer systems. In Phase 2 processing, each system creates IPsec Security Associations for securing data traffic sent between the systems by negotiating one or more Security Associations and the systems exchange IP addresses by using phased IDs and policies (steps 660 and 670, for further details about IDs and policies see FIG. 7). After the IDs have been exchanged and a security association has been negotiated, each system sends and receives protected data traffic using the established policies and profiles (steps 670 and 675).

FIG. 7 depicts a high level flow chart which illustrates establishing a standard format to use by any operating system and any machine type to automatically configure IP security tunnels in accordance with the present invention. The process starts as depicted by block 700 and thereafter passes to block 702 which illustrates establishing a standard format as a document type definition (DTD) file for specifying IP security tunnels. A DTD file defines a collection of elements that may appear in an XML file. Next, block 704 depicts including a root element in the standard. The following is an example of a root element:

```
<!ELEMENT AIX_VPN ((IKEProtection|IKEGroup|IKETunnel|
    IKEPre-sharedKey|IPSecProposal|
    IPSecProtection|IPSecTunnel)+)>
```

Any combination of IKEProtection, IKEGroup, IKEPresharedKey, IKETunnel, IPSecProposal, IPSecProtection, IPSecTunnel elements may be included in the root element. Any number of occurrences of each element may be included in the root element.

Block 706 illustrates including a protection element in the standard which includes a listing of IKE transforms. The following is an example of a protection element:

```
<!ELEMENT IKEProtection (IKETransform+)>
<!ATTLIST IKEProtection
    IKE_ProtectionName ID #REQUIRED
    IKE_Role (Initiator|Responder|Both|Neither)"Both"
    IKE_XCHGMode (Main|Aggressive)"Main"
    IKE_KeyOverlap CDATA "5"
```

-continued

```
        IKE__Flags__UseCRL(Yes|No)"No"
        IKE__ResponderKeyRefreshMaxMinutes CDATA "480"
        IKE__ResponderKeyRefreshMinMinutes CDATA "15"
        IKE__ResponderKeyRefreshMinKB CDATA #IMPLIED
        IKE__ResponderKeyRefreshMaxKB CDATA #IMPLIED
>
```

Thereafter, block 708 depicts including a transform element in the standard. A list of transform elements will be used for phase 1 security associations negotiations. The following is an example of a transform element:

```
<!ELEMENT IKETransform EMPTY>
<!ATTLIST IKETransform
        IKE__AuthenticationMethod (Preshared_key |
RSA_signatures)
                        "Preshared_key"
        IKE__Encryption (DES-CBC | 3DES-CBC) "3DES-CBC"
        IKE__Hash (SHA | MD5) "SHA"
        IKE__DHGroup (1 | 2 ) "2"
        IKE__KeyRefreshMinutes CDATA "480"
>
```

The process then passes to block 710 which illustrates including a group element in the standard. This element can contain multiple identification elements. The purpose of this element is to allow the same protections and policies to be shared by multiple IDs. The following is an example of a group element:

```
<!ELEMENT IKEGroup (IKEID+)>
<!ATTLIST IKEGroup
        IKE__GroupName ID #REQUIRED
>
```

Next, block 712 depicts including an identification element in the standard. This element includes identification types that can be used by both phase 1 and phase 2 tunnels. However, not all of the identification types are valid in both phases. Phase 1 can use ASN1_DN, FQDN, User_FQDN, and KEYID. Phase 2 can use IPV4_Subnet, IPV6_Subnet, IPV4_Address_Range, and IPV6_Address_Range. Both phases can use IPV4_Address and IPV6_Address. The protocol and port attributes are only valid in phase 2. The following is an example of an identification element:

```
<!ELEMENT IKEID (ASN1__DN | FQDN | User__FQDN |
IPV4__Address |
                IPV6__Address | KEYID | IPV4__Subnet |
IPV6__Subnet |
                IPV6__Address__Range |
IPV4__Address__Range)>
<!ATTLIST IKEID
        Protocol CDATA "0"
        Port     CDATA "0"
>
```

Thereafter, block 714 illustrates including a tunnel element in the standard. This element defines the phase 1 security association endpoints and the IKEProtection element to be used for the negotiation. The following is an example of a tunnel element:

```
<!ELEMENT IKETunnel (IKELocalIdentity,
IKERemoteIdentity)>
<!ATTLIST IKETunnel
        IKE__TunnelName ID #REQUIRED
        IKE__ProtectionRef IDREF #REQUIRED
        IKE__Flags__MakeRuleWithOptionalIP (Yes | No) "No"
        IKE__Flags__AutoStart (Yes | No) "No"
>
```

The "MakeRuleWithOptionalIP" field specifies whether another entry will be put in the rules list using the optional IP address specified in the remote identity element. If this field is set to "no", more than one tunnel can be defined using the same optional IP address; however, the computer system cannot act as a responder in a main mode negotiation with this tunnel. If an optional IP address is specified for the local identity element when the "MakeRuleWithOptionalIP" is set to "no", the optional IP address will be silently discarded as extraneous information for that negotiation type.

The process then passes to block 716 which depicts including a local identity element and a remote identity element in the standard. These elements define the local and remote IDs. The following are examples of a local identity element and a remote identity element:

```
<!ELEMENT IKELocalIdentity (ASN1__DN | FQDN | User__FQDN |
                        IPV4__Address |
                        IPV6__Address | KEYID)>
<!ELEMENT IKERemoteIdentity (ASN1__DN | FQDN | User__FQDN |
                        IPV4__Address |IPV6__Address
| KEYID |
                        IKEGroupRef)>
```

Next, block 718 illustrates including an ID type element in the standard. These following are examples of possible ID type elements which may be included in the standard:

```
<!ELEMENT IPV4__Address EMPTY>
<!ATTLIST  IPV4__Address
                Value CDATA #REQUIRED
>
<!ELEMENT IPV4__Subnet EMPTY>
<!ATTLIST  IPV4__Subnet
                IPAddr   CDATA #REQUIRED
                Netmask CDATA #REQUIRED
>
<!ELEMENT IPV4__Address__Range EMPTY>
<!ATTLIST  IPV4__Address__Range
                From__IPAddr   CDATA #REQUIRED
                To__IPAddr CDATA #REQUIRED
>
<!ELEMENT IPV6__Address EMPTY>
<!ATTLIST  IPV6__Address
                Value CDATA #REQUIRED
>
<!ELEMENT IPV6__Subnet EMPTY>
<!ATTLIST  IPV6__Subnet
                IPV6__Addr CDATA #REQUIRED
                IPV6__PrefixLength CDATA #REQUIRED
>
<!ELEMENT IPV6__Address__Range EMPTY>
<!ATTLIST  IPV6__Address__Range
                From__IPV6__Addr CDATA #REQUIRED
                To__IPV6__Addr   CDATA #REQUIRED
>
<!ELEMENT FQDN (IPV4__Address | IPV6__Address)?>
```

-continued

```
<!ATTLIST FQDN
        Value CDATA #REQUIRED
>
<!ELEMENT User_FQDN (IPV4_Address | IPV6_Address)?>
<!ATTLIST User_FQDN
        Value CDATA #REQUIRED
>
<!ELEMENT ASN1_DN (IPV4_Address | IPV6_Address)?>
<!ATTLIST ASN1_DN
        Value CDATA #REQUIRED
>
<!ELEMENT KEYID (IPV4_Address | IPV6_Address)?>
<!ATTLIST KEYID
        Value CDATA #REQUIRED
>
```

The process then passes to block 720, which depicts including a remote pre-shared key ID element in the standard. This element is the ID definition for remote pre-shared key. The following is an example of a remote pre-shared key ID element:

```
<!ELEMENT IKEPresharedRemoteID (PK_ASN1_DN | PK_FQDN |
                                PK_User_FQDN |
PK_IPV4_Address |
                                PK_IPV6_Address |
PK_KEYID)>
```

Block 722, then, illustrates including a pre-shared key element in the standard. This element is the ID definition for the pre-shared key. The following is an example of a pre-shared key element:

```
<!ELEMENT PK_IPV4_Address EMPTY>
<!ATTLIST PK_IPV4_Address
            Value CDATA #REQUIRED
>
<!ELEMENT PK_IPV6_Address EMPTY>
<!ATTLIST PK_IPV6_Address
            Value CDATA #REQUIRED
>
<!ELEMENT PK_FQDN EMPTY>
<!ATTLIST PK_FQDN
            Value CDATA #REQUIRED
>
<!ELEMENT PK_User_FQDN EMPTY>
<!ATTLIST PK_User_FQDN
            Value CDATA #REQUIRED
>
<!ELEMENT PK_ASN1_DN EMPTY>
<!ATTLIST PK_ASN1_DN
            Value CDATA #REQUIRED
>
<!ELEMENT PK_KEYID EMPTY>
<!ATTLIST PK_KEYID
            Value CDATA #REQUIRED
>
```

Next, block 724 depicts including an IPsec proposal element in the standard. This element includes a list of IPSec encapsulating security protocol (ESP) protocols and/or IPSec authentication header (AH) protocols elements. The following is an example of an IPsec proposal element:

```
<!ELEMENT IPSecProposal ((IPSecESPProtocol |
IPSecAHProtocol)+)>
```

```
<!ATTLIST IPSecProposal
            IPSec_ProposalName ID #REQUIRED
>
```

The process then passes to block 726 which illustrates including an IPsec ESP protocol element in the standard. This element defines an IPsec ESP protocol. The following is an example of an IPsec ESP protocol element:

```
<!ELEMENT IPSecESPProtocol EMPTY>
<!ATTLIST IPSecESPProtocol
        ESP_Encryption (ESP_DES | ESP_3DES | ESP_NULL )
"ESP_DES"
        ESP_Authentication (HMAC-MD5 | HMAC-SHA | NONE )
"HMAC-SHA"
        ESP_EncapsulationMode (Tunnel | Transport )
"Tunnel"
        ESP_KeyRefreshMinutes CDATA "60"
        ESP_KeyRefreshKB      CDATA #IMPLIED
>
```

Thereafter, block 728 depicts including an IPsec authentication header protocol element in the standard. This element defines an authentication header protocol. The following is an example of an authentication header protocol element:

```
<!ELEMENT IPSecAHProtocol EMPTY>
<!ATTLIST IPSecAHProtocol
        AH_Authentication (AH_MD5 | AH_SHA ) "AH_SHA"
        AH_EncapsulationMode (Tunnel | Transport )
"Tunnel"
        AH_KeyRefreshMinutes CDATA "60"
        AH_KeyRefreshKB      CDATA #IMPLIED
>
```

Next, block 730 illustrates including an IPsec protection element in the standard. This element defines IPsec protection. The following is an example of an IPsec protection element:

```
<!ELEMENT IPSecProtection EMPTY>
<!ATTLIST IPSecProtection
    IPSec_ProtectionName ID #REQUIRED
    IPSec_ProposalRefs IDREFS #REQUIRED
    IPSec_Role (Initiator|Responder|Both|Neither)
"Both"
    IPSec_KeyOverlap     CDATA "5"
    IPSec_Flags_UseCommitBit (Yes | No) "No"
    IPSec_Flags_UseLifeSize  (Yes | No) "No"
    IPSec_InitiatorDHGroup   (0 | 1 | 2 ) "0"
    IPSec_ResponderDHGroup   (NO_PFS | GROUP_1 |
GROUP_2 |
                                GROUP_1_OR_2 |
                                NO_PFS_OR_
                                GROUP_1_OR_2)
                                "NO_PFS_OR_
                                GROUP_1_OR_2"
    IPSec_ResponderKeyRefreshMaxMinutes CDATA "120"
    IPSec_ResponderKeyRefreshMinMinutes CDATA "1"
    IPSec_ResponderKeyRefreshMaxKB CDATA #IMPLIED
    IPSec_ResponderKeyRefreshMinKB CDATA #IMPLIED
>
```

The process then terminates as depicted by block 732.

FIG. 8 illustrates a high level flow chart which depicts automatically configuring an IP security tunnel using a standard format in accordance with the present invention. The process starts as depicted by block 800 and thereafter passes to block 802 which depicts generating an XML file under the guidelines of the standard format defined by the DTD file described in more detail in FIG. 7. Next, block 804 illustrates including elements from the standard as necessary to properly configure an IP security tunnel. Thereafter, block 806 depicts processing the XML file. Processing this file automatically configures an IP security tunnel. The process then terminates as depicted by block 808.

Below is an example of an XML file that configures a tunnel under the guidelines of the standard.

```
<?xml version="1.0" ?>
<!DOCTYPE AIX_VPN SYSTEM "ike.dtd">
<AIX_VPN>
<!-- Define a Phase 1 policy -->
<IKEProtection IKEProtectionName="IBM_low_CertSig"
        IKEResponderKeyRefreshMinTime="300"
        IKEResponderKeyRefreshMaxTime="81400">
    <!-- Define the transforms underneath this
IKEprotection -->
    <IKETransform AuthMethod="RSASignature" Encrypt="DES"
                Hash="SHA" IKEDHGroup="1"/>
    <IKETransform AuthMethod="PresharedKey"
IKEDHGroup="1"/>
</IKEProtection>
<!-- An example for the group -->
<IKEGroup IKEGroupName="P1Group_shruthi">
    <ASN1_DN
Value="/C=US/O=IBM/OU=IPSec/CN=shruthi.austin.ibm.com">
        <IPV4_Address Value="9.53.150.11"/>
    </ASN1_DN>
    <FQDN Value="shruthi.austin.ibm.com">
        <IPV4_Address Value="9.53.150.11"/>
    </FQDN>
    <IPV4_Address Value="9.53.150.11"/>
</IKEGroup>
<!-- Define the phase 1 tunnel -->
<IKETunnel IKETunnelName="P1_Apricot"
IKEProtectionRef="IBM_low_CertSig">
    <IKELocalIdentity>
        <IPV4_Address Value="9.3.97.138"/>
    </IKELocalIdentity>
    <IKERemoteIdentity>
        <IPV4_Address Value="9.3.97.66"/>
    </IKERemoteIdentity>
</IKETunnel>
<!-- Define the phase 1 Tunnel with remote-id being a
group name -->
<IKETunnel IKETunnelName="P1_Apricot_Group"
        IKEProtectionRef="IBM_low_CertSig">
    <IKELocalIdentity>
        <IPV4_Address Value="9.3.97.138"/>
    </IKELocalIdentity>
    <IKERemoteIdentity>
        <IKEGroupRef IKEGroupNameRef="P1Group_shruthi"/>
    </IKERemoteIdentity>
</IKETunnel>
<!-- Specify the preshared keys for the 9.3.97.138 &
9.53.150.11 -->
<IKEPresharedKey Value='abcd'">
    <IKEPresharedRemoteID>
        <IPV4_Address Value="9.53.150.11"/>
    </IKEPresharedRemoteID>
</IKEPresharedKey>
<!-- Define a Phase 2 proposal -->
<IPSecProposal ProposalName="IBM_ESP_tunnel_Proposal">
    <IPSecProtocol Protocol="ESP" ESP_Encryption="DES"
                ESP_Authentication="HMAC-MD5"
KeyRefreshTime="28800"/>
</IPSecProposal>
<IPSecProtection
IPSecProtectionName="IBM_ESP_tunnel_policy"
        IPSecInitiatorDHGroup="1"
IPSecKeyRefreshMinTime="120"
        IPSecKeyRefreshMaxTime="81400"
IPSecProposalRefs="IBM_ESP_tunnel_Proposal"/>
<IPSecTunnel IPSecTunnelName="P2_Apricot"
IKETunnelName="P1_Apricot"
        IPSecProtectionRef="IBM_ESP_tunnel_policy">
    <IPSecLocalIdentity>
        <IPV4_Address Value="9.3.97.138"/>
    </IPSecLocalIdentity>
    <IPSecRemoteIdentity>
        <IPV4_Address Value="9.3.97.66"/>
    </IPSecRemoteIdentity>
</IPSecTunnel>
</AIX_VPN>
```

In this example, explicit policy and tunnel choices are being specified, namely using RSA signature mode for authentication with Diffie Helmann group 1 with local identity 9.3.97.138 and remote identity 9.3.97.66. In this example, the use of DES with HMAC-MD5 and a refresh time of 28800 seconds are requested.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for automatically configuring IP security tunnels, said computer implemented method comprising the steps of:
retrieving a remote computer system identifier;
determining whether a local-remote pair corresponding to the identifier is found, wherein the local-remote pair is used in selecting a security policy, and wherein an error is reported indicating that a user needs to configure a tunnel with the remote computer system if the local-remote pair is not found;
defining a configuration of an IP security tunnel between the data processing system and the remote computer system utilizing a security policy specification format, wherein said security policy specification format is established as a document type definition (DTD) file capable of being utilized by a plurality of different operating systems and a plurality of different machine types; and including a plurality of different elements in said DTD file, each of said plurality of different elements being utilized to configure an IP security tunnel.

2. The method according to claim 1, wherein said DTD file defines a collection of elements, and further comprising:

generating an XML file utilizing the collection of elements defined in said DTD file, wherein said XML file defines a configuration of a particular IP security tunnel, and wherein said XML file is processed to automatically configure said IP security tunnel defined by the XML file.

3. The method according to claim 1, further comprising the steps of:

generating an XML file utilizing a plurality of said plurality of different elements included within said DTD file; and processing said XML file to automatically configure an IP security tunnel.

4. The method according to claim 1, further comprising the step of including a root element in said security policy specification format.

5. The method according to claim 1, further comprising the step of establishing a protection element in said security policy specification format, said protection element including a listing of IKE transforms.

6. The method according to claim 1, further comprising the step of establishing a transform element in said security policy specification format.

7. The method according to claim 1, further comprising the step of establishing a group element in said security policy specification format, wherein said group element contains multiple identification elements.

8. The method according to claim 1, further comprising the step of establishing an identification element in said security policy specification format.

9. The method according to claim 1, further comprising the step of establishing a tunnel element in said security policy specification format.

10. The method according to claim 1, further comprising the step of establishing a root element, a protection element, a transform element, a group element, an identification element, a tunnel element, a local/remote identify element, an ID type element, an ID definition element, a pre-shared key element, an IPsec proposal element, an IPsec ESP protocol element, an IPsec authentication header element, and an IPsec protection element in said security policy specification format.

11. The method according to claim 1, further comprising the step of automatically configuring an IP security tunnel utilizing said security policy specification format.

12. The method according to claim 1, further comprising the step of comparing a first IP security tunnel to a second IP security tunnel utilizing a first security policy specification format that is associated with said first IP security tunnel and a second security policy specification format that is associated with a second IP security tunnel.

13. A computer program product comprising:

a computer readable recordable medium having computer usable program code for defining a configuration of IP security tunnels in a data processing system, comprising:

computer usable program code for retrieving a remote computer system identifier;

computer usable program code for determining whether a local-remote pair corresponding to the identifier is found, wherein the local-remote pair is used in selecting a security policy, and wherein an error is reported indicating that a user needs to configure a tunnel with the remote computer system if the local-remote pair is not found;

computer usable program code for automatically configuring an IP security tunnel between the data processing system and the remote computer system utilizing a security policy specification format wherein said security policy specification format is established as a document type definition (DTD) file capable of being utilized by a plurality of different operating systems and a plurality of different machine types; and computer usable program code for including a plurality of different elements in said DTD file, each of said plurality of different elements being utilized to configure an IP security tunnel.

14. The product according to claim 13, wherein said DTD file defines a collection of elements, and further comprising:

generating an XML file utilizing the collection of elements defined in said DTD file, wherein said XML file defines a configuration of a particular IP security tunnel, and wherein said XML file is processed to automatically configure said IP security tunnel defined by the XML file.

15. The product according to claim 13, further comprising:

computer usable program code for generating an XML file utilizing a plurality of said plurality of different elements included within said DTD file; and computer usable program code for processing said XML file to automatically configure an IP security tunnel.

16. The product according to claim 13, further comprising computer usable program code for including a root element in said security policy specification format.

17. The product according to claim 13, further comprising computer usable program code for establishing a protection element in said security policy specification format, said protection element including a listing of IKE transforms.

18. The product according to claim 13, further comprising computer usable program code for establishing a transform element in said security policy specification format.

19. The product according to claim 13, further comprising computer usable program code for establishing a group element in said security policy specification format, wherein said group element contains multiple identification elements.

20. The product according to claim 13, further comprising computer usable program code for establishing an identification element in said security policy specification format.

21. The product according to claim 13, further comprising computer usable program code for establishing a tunnel element in said security policy specification format.

22. The product according to claim 13, further comprising computer usable program code for establishing a root element, a protection element, a transform element, a group element, an identification element, a tunnel element, a local/remote identify element, an ID type element, an ID definition element, a pre-shared key element, an IPsec proposal element, an IPsec ESP protocol element, an IPsec authentication header element, and an IPsec protection element in said security policy specification format.

23. The product according to claim 13, further comprising computer usable program code for automatically configuring an IP security tunnel utilizing said security policy specification format.

24. The product according to claim 13, further comprising computer usable program code for comparing a first IP security tunnel to a second IP security tunnel utilizing a first security policy specification format that is associated with said first IP security tunnel and a second security policy specification format that is associated with a second IP security tunnel.

25. A data processing system for automatically configuring IP security tunnels, comprising:
- a computer;
- a computer readable medium containing computer readable instructions, wherein the computer executes the computer readable instructions to retrieve a remote computer system identifier; determine whether a local-remote pair corresponding to the identifier is found, wherein the local-remote pair is used in selecting a security policy, and wherein an error is reported indicating that a user needs to configure a tunnel with the remote computer system if the local-remote pair is not found; automatically configure an IP security tunnel between the data processing system and the remote computer system utilizing a security policy specification format, wherein said security policy specification format is established as a document type definition (DTD) file capable of being utilized by a plurality of different operating systems and a plurality of different machine types; and include a plurality of different elements in said DTD file, each of said plurality of different elements being utilized to configure an IP security tunnel.

26. The system according to claim 25, wherein said DTD file defines a collection of elements, and further comprising:
- generating an XML file utilizing the collection plurality of different elements defined in said DTD file, wherein said XML file defines a configuration of a particular IP security tunnel, and wherein said XML file is processed to automatically configure said IP security tunnel defined by the XML file.

27. The system according to claim 25, further comprising:
- an XML file being generated utilizing a plurality of said plurality of different elements included within said DTD file; and
- said system for processing said XML file to automatically configure an IP security tunnel.

28. The system according to claim 25, further comprising a root element being included in said security policy specification format.

29. The system according to claim 25, further comprising a protection element being included in said security policy specification format, said protection element including a listing of IKE transforms.

30. The system according to claim 25, further comprising a transform element being included in said security policy specification format.

31. The system according to claim 25, further comprising a group element being included in said security policy specification format, wherein said group element contains multiple identification elements.

32. The system according to claim 25, further comprising an identification element being included in said security policy specification format.

33. The system according to claim 25, further comprising a tunnel element being included in said security policy specification format.

34. The system according to claim 25, further comprising a root element, a protection element, a transform element, a group element, an identification element, a tunnel element, a local/remote identify element, an ID type element, an ID definition element, a pre-shared key element, an IPsec proposal element, an IPsec ESP protocol element, an IPsec authentication header element, and an IPsec protection element being included in said security policy specification format.

35. The system according to claim 25, further comprising said system for automatically configuring an IP security tunnel utilizing said security policy specification format.

36. The system according to claim 25, further comprising said system for comparing a first IP security tunnel to a second IP security tunnel utilizing a first security policy specification format that is associated with said first IP security tunnel and a second security policy specification format that is associated with a second IP security tunnel.

* * * * *